(12) United States Patent
Lewis et al.

(10) Patent No.: US 10,422,230 B2
(45) Date of Patent: Sep. 24, 2019

(54) COOLING HOLE WITH CURVED METERING SECTION

(71) Applicant: United Technologies Corporation, Hartford, CT (US)

(72) Inventors: Scott D. Lewis, Vernon, CT (US); Mark F. Zelesky, Bolton, CT (US); Dominic J. Mongillo, West Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 583 days.

(21) Appl. No.: 15/008,148

(22) Filed: Jan. 27, 2016

(65) Prior Publication Data

US 2017/0081959 A1 Mar. 23, 2017

Related U.S. Application Data

(63) Continuation-in-part of application No. 14/478,630, filed on Sep. 5, 2014, now Pat. No. 9,988,933, which
(Continued)

(51) Int. Cl.
 *F01D 5/18* (2006.01)
 *F23R 3/00* (2006.01)
(Continued)

(52) U.S. Cl.
 CPC .............. *F01D 5/186* (2013.01); *F01D 5/225* (2013.01); *F01D 9/02* (2013.01); *F01D 9/065* (2013.01);
(Continued)

(58) Field of Classification Search
 CPC .................. F01D 5/186; F23R 3/002; F23R 2900/03042; F05D 2240/81; F05D 2260/202; Y02T 50/676
 See application file for complete search history.

(56) References Cited

U.S. PATENT DOCUMENTS

| 4,197,443 A | 4/1980 | Sidenstick |
| 4,529,358 A | 7/1985 | Papell |

(Continued)

FOREIGN PATENT DOCUMENTS

| EP | 1326007 A2 | 7/2003 |
| EP | 1609949 A1 | 12/2005 |

(Continued)

OTHER PUBLICATIONS

Extended European Search Report for EP Application No. 17153157.7, dated May 19, 2017, 8 pages.

(Continued)

*Primary Examiner* — Carlos A Rivera
(74) *Attorney, Agent, or Firm* — Kinney & Lange, P.A.

(57) ABSTRACT

A gas turbine engine component having a cooling hole includes a first wall having a cooling hole inlet, a second wall generally opposite the first wall and having a cooling hole outlet, a metering section extending downstream from the inlet and having a hydraulic diameter ($d_h$), and a diffusing section extending from the metering section to the outlet. The metering section includes a substantially convex first surface extending from a first end to a second end, a substantially concave second surface extending from a third end to a fourth end, and first and second curved portions connecting the ends of the first and second surfaces.

18 Claims, 14 Drawing Sheets

Related U.S. Application Data is a continuation of application No. 13/544,125, filed on Jul. 9, 2012, now Pat. No. 8,850,828.

(60) Provisional application No. 61/599,378, filed on Feb. 15, 2012, provisional application No. 61/599,381, filed on Feb. 15, 2012.

(51) Int. Cl.

| | |
|---|---|
| *F01D 9/02* | (2006.01) |
| *F01D 5/22* | (2006.01) |
| *F01D 11/08* | (2006.01) |
| *F01D 25/24* | (2006.01) |
| *F01D 25/12* | (2006.01) |
| *F02C 7/18* | (2006.01) |
| *F01D 9/06* | (2006.01) |

(52) U.S. Cl.
CPC .............. *F01D 11/08* (2013.01); *F01D 25/12* (2013.01); *F01D 25/24* (2013.01); *F02C 7/18* (2013.01); *F23R 3/002* (2013.01); *F05D 2220/32* (2013.01); *F05D 2240/35* (2013.01); *F05D 2240/81* (2013.01); *F05D 2260/202* (2013.01); *F23R 2900/03042* (2013.01); *Y02T 50/676* (2013.01)

(56) References Cited

U.S. PATENT DOCUMENTS

| | | |
|---|---|---|
| 4,622,821 A | 11/1986 | Madden |
| 4,653,279 A | 3/1987 | Reynolds |
| 4,653,983 A | 3/1987 | Vehr |
| 4,672,727 A | 6/1987 | Field |
| 4,684,323 A | 8/1987 | Field |
| 4,700,544 A | 10/1987 | Fucci |
| 4,738,588 A | 4/1988 | Field |
| 5,062,768 A | 11/1991 | Marriage |
| 5,096,379 A | 3/1992 | Stroud et al. |
| 5,129,231 A | 7/1992 | Becker et al. |
| 5,252,026 A | 10/1993 | Shepherd |
| 5,326,224 A | 7/1994 | Lee et al. |
| 5,358,374 A | 10/1994 | Correia et al. |
| 5,382,133 A | 1/1995 | Moore et al. |
| 5,418,345 A | 5/1995 | Adamski |
| 5,419,681 A | 5/1995 | Lee |
| 5,609,779 A | 3/1997 | Crow et al. |
| 5,651,662 A | 7/1997 | Lee et al. |
| 5,660,525 A | 8/1997 | Lee et al. |
| 5,683,600 A | 11/1997 | Kelley et al. |
| 5,813,836 A | 9/1998 | Starkweather |
| 6,139,258 A | 10/2000 | Lang, III et al. |
| 6,183,199 B1 | 2/2001 | Beeck et al. |
| 6,241,468 B1 | 6/2001 | Lock et al. |
| 6,243,948 B1 | 6/2001 | Lee et al. |
| 6,287,075 B1 | 9/2001 | Kercher |
| 6,307,175 B1 | 10/2001 | Blochlinger et al. |
| 6,494,678 B1 | 12/2002 | Bunker |
| 6,547,524 B2 | 4/2003 | Kohli et al. |
| 6,572,335 B2 | 6/2003 | Kuwabara et al. |
| 6,744,010 B1 | 6/2004 | Pepe et al. |
| 6,944,580 B1 | 9/2005 | Blume et al. |
| 6,973,419 B1 | 12/2005 | Fortin et al. |
| 6,979,176 B2 | 12/2005 | Nakamata et al. |
| 7,186,085 B2 | 3/2007 | Lee |
| 7,273,351 B2 | 9/2007 | Kopmels |
| 7,328,580 B2 | 2/2008 | Lee et al. |
| 7,374,401 B2 | 5/2008 | Lee |
| 7,578,653 B2 | 8/2009 | Klasing et al. |
| 7,726,131 B2 | 6/2010 | Sze et al. |
| 7,766,609 B1 | 8/2010 | Liang |
| 7,887,294 B1 | 2/2011 | Liang |
| 7,997,868 B1 | 8/2011 | Liang |
| 8,038,399 B1 | 10/2011 | Liang |
| 8,057,181 B1 | 11/2011 | Liang |
| 8,245,519 B1 * | 8/2012 | Liang ................ F01D 5/186 415/115 |
| 8,683,813 B2 * | 4/2014 | Xu ................ F01D 5/186 415/115 |
| 8,850,828 B2 * | 10/2014 | Mongillo, Jr. ........... F01D 5/186 60/806 |
| 2001/0036401 A1 | 11/2001 | Harvey et al. |
| 2002/0159888 A1 | 10/2002 | Rinck et al. |
| 2005/0106020 A1 | 5/2005 | Bunker et al. |
| 2005/0286998 A1 | 12/2005 | Lee et al. |
| 2008/0003096 A1 * | 1/2008 | Kohli ................ F01D 5/186 415/115 |
| 2008/0145208 A1 | 6/2008 | Klasing et al. |
| 2008/0286090 A1 | 11/2008 | Okita |
| 2009/0013695 A1 | 1/2009 | Dierberger et al. |
| 2009/0074588 A1 | 3/2009 | Scott |
| 2009/0304499 A1 | 12/2009 | Stock et al. |
| 2010/0068032 A1 | 3/2010 | Liang |
| 2010/0282721 A1 | 11/2010 | Bunker et al. |
| 2011/0097191 A1 | 4/2011 | Bunker |
| 2011/0123312 A1 * | 5/2011 | Venkataramanan .... F01D 5/186 415/115 |
| 2011/0132876 A1 | 6/2011 | Pietraszkiewicz et al. |
| 2011/0185572 A1 | 8/2011 | Wei et al. |
| 2011/0293423 A1 | 12/2011 | Bunker et al. |
| 2011/0311369 A1 * | 12/2011 | Ramachandran ....... F01D 5/186 416/97 R |
| 2012/0051941 A1 | 3/2012 | Bunker |
| 2012/0167389 A1 | 7/2012 | Lacy et al. |
| 2013/0209236 A1 * | 8/2013 | Xu ................ F01D 5/186 415/116 |
| 2013/0209269 A1 * | 8/2013 | Gleiner ................ F01D 5/187 416/97 R |
| 2016/0047251 A1 * | 2/2016 | Xu ................ F01D 5/189 416/97 R |

FOREIGN PATENT DOCUMENTS

| | | |
|---|---|---|
| EP | 2083147 A1 | 7/2009 |
| EP | 2666964 A2 | 11/2013 |
| EP | 2937513 A2 | 10/2015 |
| EP | 2985417 A1 | 2/2016 |
| JP | 2001012204 A | 1/2001 |
| WO | WO2013122913 A1 | 8/2013 |
| WO | WO2013123012 A1 | 8/2013 |

OTHER PUBLICATIONS

Kusterer, K. et al. "The Nekomimi Cooling Technology: Cooling Holes with Ears for High-Efficient Film Cooling" Proceedings of ASME Turbo Expo 2011, Jun. 6-10, 2011. 11 pages.

The International Search Report and Written Opinion, dated Jun. 2, 2013 for International Application No. PCT/US2013/025700.

European Patent Office, extended European search report, dated Dec. 10, 2015, 8 pages.

* cited by examiner

COOLING HOLE WITH CURVED METERING SECTION

CROSS-REFERENCE TO RELATED APPLICATION

This application is a continuation-in-part of U.S. application Ser. No. 14/478,630, filed Sep. 5, 2014, and entitled "COOLING HOLE WITH CURVED METERING SECTION", which is a continuation of U.S. application Ser. No. 13/544,125, filed Jul. 9, 2012, and entitled "COOLING HOLE WITH CURVED METERING SECTION", which claims priority to U.S. Provisional Application No. 61/599,378, filed on Feb. 15, 2012 and entitled "COOLING HOLE WITH CURVED METERING SECTION" and U.S. Provisional Application No. 61/599,381, filed on Feb. 15, 2012 and entitled "TRI-LOBED COOLING HOLE AND METHOD OF MANUFACTURE", the disclosures of which are incorporated by reference in their entirety.

BACKGROUND

This invention relates generally to turbomachinery, and specifically to turbine flow path components for gas turbine engines. In particular, the invention relates to cooling techniques for airfoils and other gas turbine engine components exposed to hot working fluid flow, including, but not limited to, rotor blades and stator vane airfoils, endwall surfaces including platforms, shrouds and compressor and turbine casings, combustor liners, turbine exhaust assemblies, thrust augmentors and exhaust nozzles.

Gas turbine engines are rotary-type combustion turbine engines built around a power core made up of a compressor, combustor and turbine, arranged in flow series with an upstream inlet and downstream exhaust. The compressor section compresses air from the inlet, which is mixed with fuel in the combustor and ignited to generate hot combustion gas. The turbine section extracts energy from the expanding combustion gas, and drives the compressor section via a common shaft. Expanded combustion products are exhausted downstream, and energy is delivered in the form of rotational energy in the shaft, reactive thrust from the exhaust, or both.

Gas turbine engines provide efficient, reliable power for a wide range of applications in aviation, transportation and industrial power generation. Small-scale gas turbine engines typically utilize a one-spool design, with co-rotating compressor and turbine sections. Larger-scale combustion turbines including jet engines and industrial gas turbines (IGTs) are generally arranged into a number of coaxially nested spools. The spools operate at different pressures, temperatures and spool speeds, and may rotate in different directions.

Individual compressor and turbine sections in each spool may also be subdivided into a number of stages, formed of alternating rows of rotor blade and stator vane airfoils. The airfoils are shaped to turn, accelerate and compress the working fluid flow, or to generate lift for conversion to rotational energy in the turbine.

Industrial gas turbines often utilize complex nested spool configurations, and deliver power via an output shaft coupled to an electrical generator or other load, typically using an external gearbox. In combined cycle gas turbines (CCGTs), a steam turbine or other secondary system is used to extract additional energy from the exhaust, improving thermodynamic efficiency. Gas turbine engines are also used in marine and land-based applications, including naval vessels, trains and armored vehicles, and in smaller-scale applications such as auxiliary power units.

Aviation applications include turbojet, turbofan, turboprop and turboshaft engine designs. In turbojet engines, thrust is generated primarily from the exhaust. Modern fixed-wing aircraft generally employ turbofan and turboprop configurations, in which the low pressure spool is coupled to a propulsion fan or propeller. Turboshaft engines are employed on rotary-wing aircraft, including helicopters, typically using a reduction gearbox to control blade speed. Unducted (open rotor) turbofans and ducted propeller engines also known, in a variety of single-rotor and contra-rotating designs with both forward and aft mounting configurations.

Aviation turbines generally utilize two and three-spool configurations, with a corresponding number of coaxially rotating turbine and compressor sections. In two-spool designs, the high pressure turbine drives a high pressure compressor, forming the high pressure spool or high spool. The low-pressure turbine drives the low spool and fan section, or a shaft for a rotor or propeller. In three-spool engines, there is also an intermediate pressure spool. Aviation turbines are also used to power auxiliary devices including electrical generators, hydraulic pumps and elements of the environmental control system, for example using bleed air from the compressor or via an accessory gearbox.

Additional turbine engine applications and turbine engine types include intercooled, regenerated or recuperated and variable cycle gas turbine engines, and combinations thereof. In particular, these applications include intercooled turbine engines, for example with a relatively higher pressure ratio, regenerated or recuperated gas turbine engines, for example with a relatively lower pressure ratio or for smaller-scale applications, and variable cycle gas turbine engines, for example for operation under a range of flight conditions including subsonic, transonic and supersonic speeds. Combined intercooled and regenerated/recuperated engines are also known, in a variety of spool configurations with traditional and variable cycle modes of operation.

Turbofan engines are commonly divided into high and low bypass configurations. High bypass turbofans generate thrust primarily from the fan, which accelerates airflow through a bypass duct oriented around the engine core. This design is common on commercial aircraft and transports, where noise and fuel efficiency are primary concerns. The fan rotor may also operate as a first stage compressor, or as a pre-compressor stage for the low-pressure compressor or booster module. Variable-area nozzle surfaces can also be deployed to regulate the bypass pressure and improve fan performance, for example during takeoff and landing. Advanced turbofan engines may also utilize a geared fan drive mechanism to provide greater speed control, reducing noise and increasing engine efficiency, or to increase or decrease specific thrust.

Low bypass turbofans produce proportionally more thrust from the exhaust flow, generating greater specific thrust for use in high-performance applications including supersonic jet aircraft. Low bypass turbofan engines may also include variable-area exhaust nozzles and afterburner or augmentor assemblies for flow regulation and short-term thrust enhancement. Specialized high-speed applications include continuously afterburning engines and hybrid turbojet/ramjet configurations.

Across these applications, turbine performance depends on the balance between higher pressure ratios and core gas path temperatures, which tend to increase efficiency, and the related effects on service life and reliability due to increased stress and wear. This balance is particularly relevant to gas turbine engine components in the hot sections of the compressor, combustor, turbine and exhaust sections, where active cooling is required to prevent damage due to high gas path temperatures and pressures.

SUMMARY

A gas turbine engine component having a cooling hole includes a first wall having a cooling hole inlet, a second wall generally opposite the first wall and having a cooling hole outlet, a metering section extending downstream from the inlet and having a hydraulic diameter ($d_h$), and a diffusing section extending from the metering section to the outlet. The metering section includes a substantially convex first surface extending from a first end to a second end, a substantially concave second surface extending from a third end to a fourth end, a first curved portion connecting the first end and the third end, and a second curved portion connecting the second end and the fourth end.

A gas turbine engine component wall includes opposing first and second wall surfaces, an inlet at the first wall surface, an outlet at the second wall surface, a metering section commencing at the inlet and having a hydraulic diameter ($d_h$), and a diffusing section in communication with the metering section and terminating at the outlet. The metering section includes a top portion having a first arcuate surface that extends from a first end to a second end, a bottom portion having a second arcuate surface that extends from a third end to a fourth end where the first arcuate surface and the second arcuate surface have arcs extending in substantially similar directions, a first curved portion connecting the first end and the third end and having a first radius such that a ratio of the first radius to the hydraulic diameter of the metering section is between 0.1 and 8, and a second curved portion connecting the second end and the fourth end and having a second radius such that a ratio of the second radius to the hydraulic diameter of the metering section is between 0.1 and 8.

DETAILED DESCRIPTION

Figure 1:
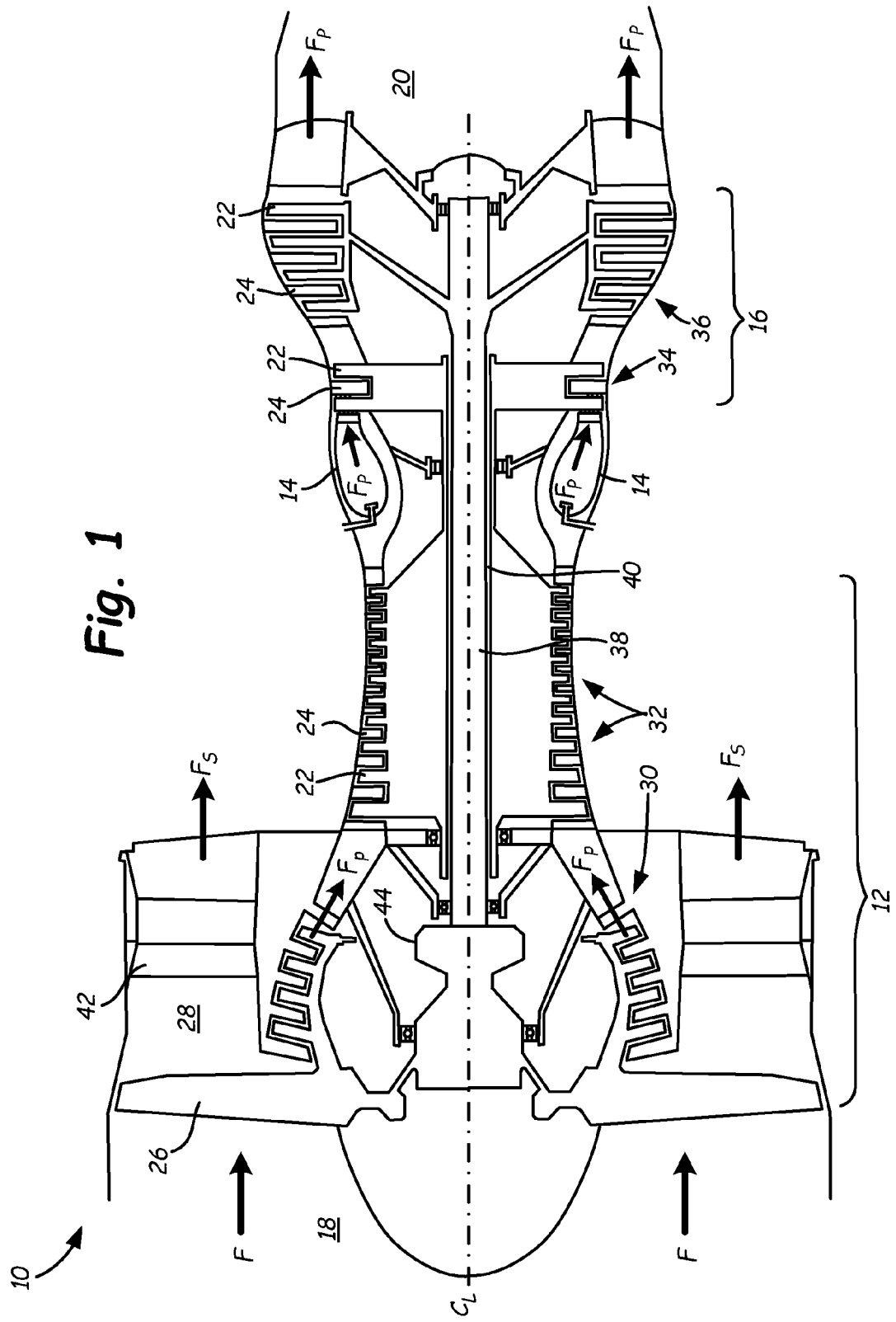
FIG. 1 is a cross-sectional view of a gas turbine engine.

FIG. 1 is a cross-sectional view of gas turbine engine 10. Gas turbine engine (or turbine engine) 10 includes a power core with compressor section 12, combustor 14 and turbine section 16 arranged in flow series between upstream inlet 18 and downstream exhaust 20. Compressor section 12 and turbine section 16 are arranged into a number of alternating stages of rotor airfoils (or blades) 22 and stator airfoils (or vanes) 24.

In the turbofan configuration of FIG. 1, propulsion fan 26 is positioned in bypass duct 28, which is coaxially oriented about the engine core along centerline (or turbine axis) $C_L$. An open-rotor propulsion stage 26 may also provided, with turbine engine 10 operating as a turboprop or unducted turbofan engine. Alternatively, fan rotor 26 and bypass duct 28 may be absent, with turbine engine 10 configured as a turbojet or turboshaft engine, or an industrial gas turbine.

For improved service life and reliability, components of gas turbine engine 10 are provided with an improved cooling configuration, as described below. Suitable components for the cooling configuration include rotor airfoils 22, stator airfoils 24 and other gas turbine engine components exposed to hot gas flow, including, but not limited to, platforms, shrouds, casings and other endwall surfaces in hot sections of compressor 12 and turbine 16, and liners, nozzles, afterburners, augmentors and other gas wall components in combustor 14 and exhaust section 20.

In the two-spool, high bypass configuration of FIG. 1, compressor section 12 includes low pressure compressor (LPC) 30 and high pressure compressor (HPC) 32, and turbine section 16 includes high pressure turbine (HPT) 34 and low pressure turbine (LPT) 36. Low pressure compressor 30 is rotationally coupled to low pressure turbine 36 via low pressure (LP) shaft 38, forming the LP spool or low spool. High pressure compressor 32 is rotationally coupled to high pressure turbine 34 via high pressure (HP) shaft 40, forming the HP spool or high spool.

Flow F at inlet 18 divides into primary (core) flow $F_P$ and secondary (bypass) flow $F_S$ downstream of fan rotor 26. Fan rotor 26 accelerates secondary flow $F_S$ through bypass duct 28, with fan exit guide vanes (FEGVs) 42 to reduce swirl and improve thrust performance. In some designs, structural guide vanes (SGVs) 42 are used, providing combined flow turning and load bearing capabilities.

Primary flow $F_P$ is compressed in low pressure compressor 30 and high pressure compressor 32, then mixed with fuel in combustor 14 and ignited to generate hot combustion gas. The combustion gas expands to provide rotational energy in high pressure turbine 34 and low pressure turbine 36, driving high pressure compressor 32 and low pressure compressor 30, respectively. Expanded combustion gases exit through exhaust section (or exhaust nozzle) 20, which can be shaped or actuated to regulate the exhaust flow and improve thrust performance.

Low pressure shaft 38 and high pressure shaft 40 are mounted coaxially about centerline $C_L$, and rotate at different speeds. Fan rotor (or other propulsion stage) 26 is rotationally coupled to low pressure shaft 38. In advanced designs, fan drive gear system 44 is provided for additional fan speed control, improving thrust performance and efficiency with reduced noise output.

Fan rotor 26 may also function as a first-stage compressor for gas turbine engine 10, and LPC 30 may be configured as an intermediate compressor or booster. Alternatively, propulsion stage 26 has an open rotor design, or is absent, as described above. Gas turbine engine 10 thus encompasses a wide range of different shaft, spool and turbine engine configurations, including one, two and three-spool turboprop and (high or low bypass) turbofan engines, turboshaft engines, turbojet engines, and multi-spool industrial gas turbines.

In each of these applications, turbine efficiency and performance depend on the overall pressure ratio, defined by the total pressure at inlet 18 as compared to the exit pressure of compressor section 12, for example at the outlet of high pressure compressor 32, entering combustor 14. Higher pressure ratios, however, also result in greater gas path temperatures, increasing the cooling loads on rotor airfoils 22, stator airfoils 24 and other components of gas turbine engine 10. To reduce operating temperatures, increase service life and maintain engine efficiency, these components are provided with improved cooling configurations, as described below. Suitable components include, but are not limited to, cooled gas turbine engine components in compressor sections 30 and 32, combustor 14, turbine sections 34 and 36, and exhaust section 20 of gas turbine engine 10.

Figure 2A:
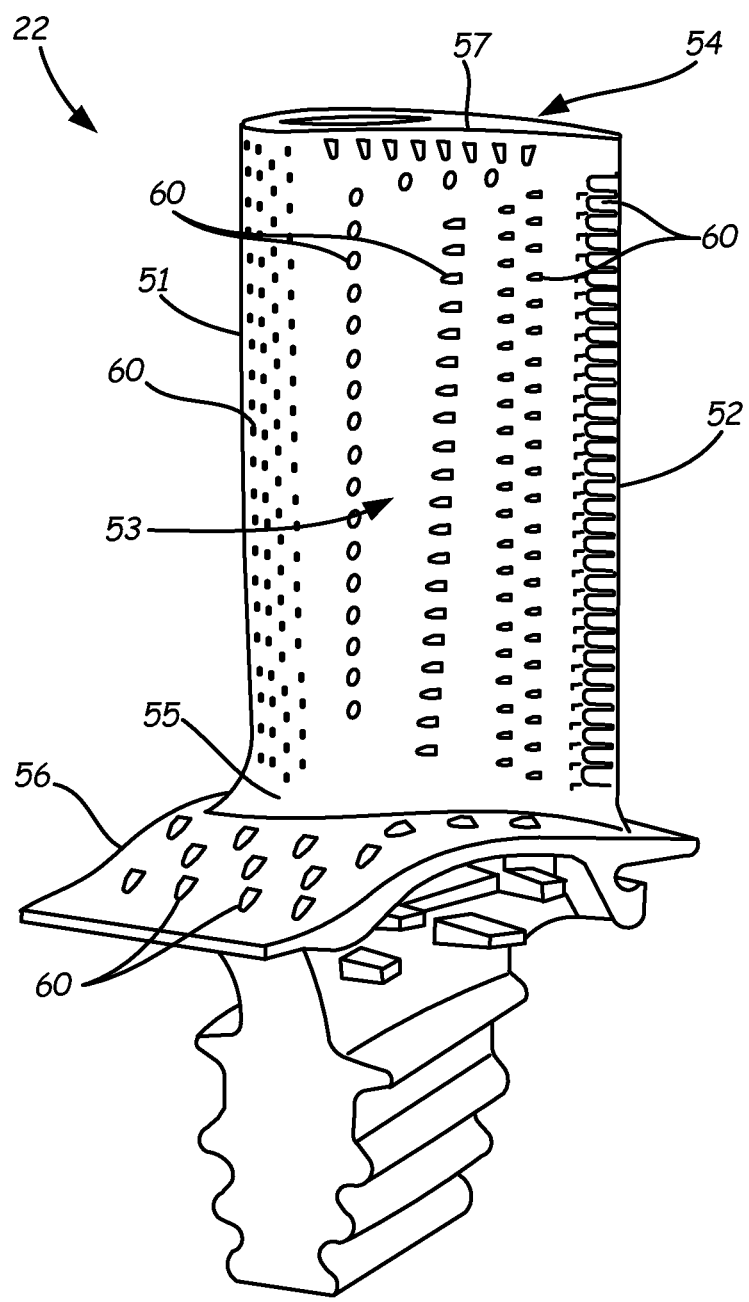
FIG. 2A is a perspective view of an airfoil for the gas turbine engine, in a rotor blade configuration.

FIG. 2A is a perspective view of rotor airfoil (or blade) 22 for gas turbine engine 10, as shown in FIG. 1, or for another turbomachine. Rotor airfoil 22 extends axially from leading edge 51 to trailing edge 52, defining pressure surface 53 (front) and suction surface 54 (back) therebetween.

Pressure and suction surfaces 53 and 54 form the major opposing surfaces or walls of airfoil 22, extending axially between leading edge 51 and trailing edge 52, and radially from root section 55, adjacent inner diameter (ID) platform 56, to tip section 57, opposite ID platform 56. In some designs, tip section 57 is shrouded.

Cooling holes or outlets 60 are provided on one or more surfaces of airfoil 22, for example along leading edge 51, trailing edge 52, pressure (or concave) surface 53, or suction (or convex) surface 54, or a combination thereof. Cooling holes or passages 60 may also be provided on the endwall surfaces of airfoil 22, for example along ID platform 56, or on a shroud or engine casing adjacent tip section 57.

Figure 2B:
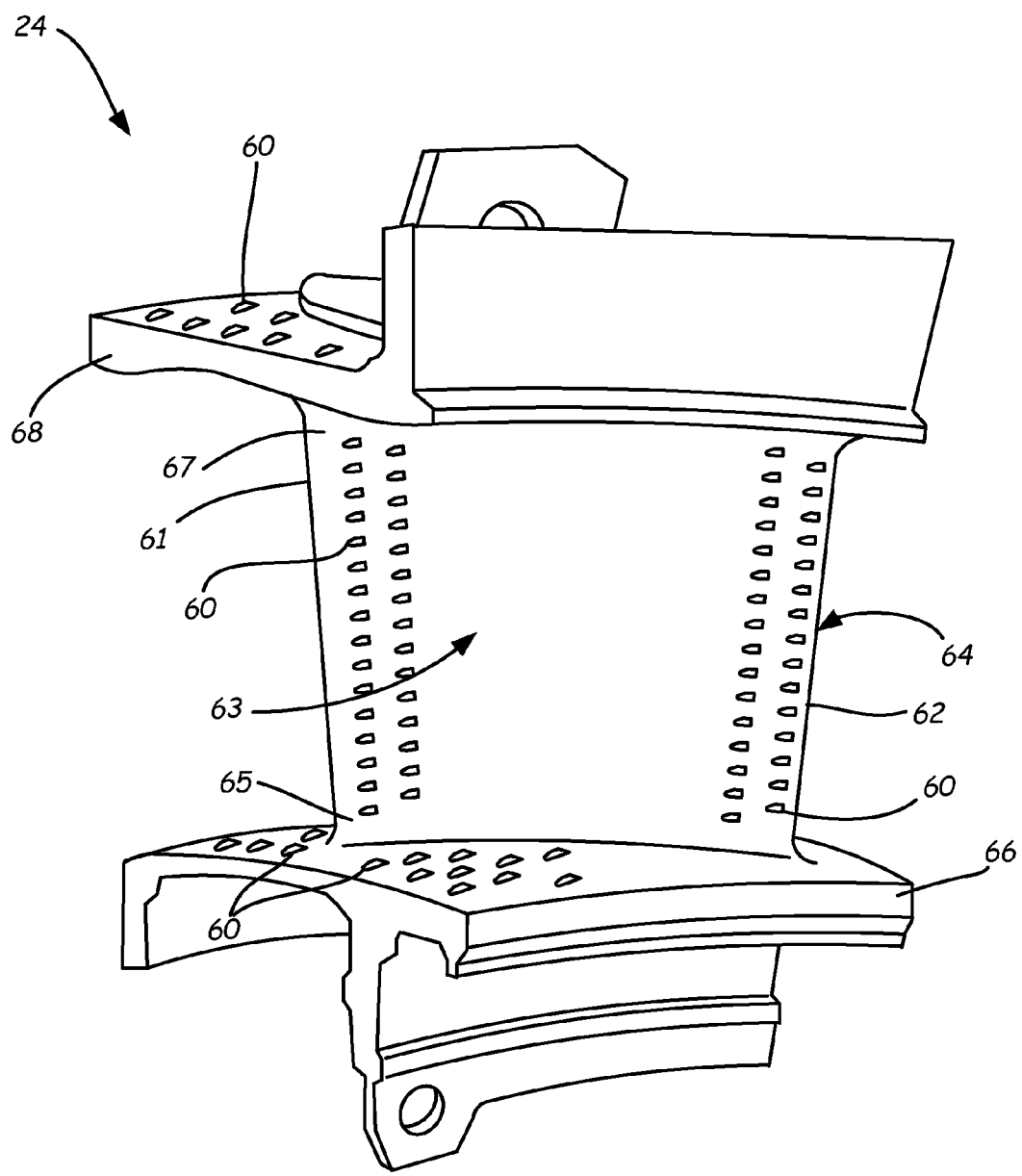
FIG. 2B is a perspective view of an airfoil for the gas turbine engine, in a stator vane configuration.

FIG. 2B is a perspective view of stator airfoil (or vane) 24 for gas turbine engine 10, as shown in FIG. 1, or for another turbomachine. Stator airfoil 24 extends axially from leading edge 61 to trailing edge 62, defining pressure surface 63 (front) and suction surface 64 (back) therebetween. Pressure and suction surfaces 63 and 64 extend from inner (or root) section 65, adjacent ID platform 66, to outer (or tip) section 67, adjacent outer diameter (OD) platform 68.

Cooling holes or outlets 60 are provided along one or more surfaces of airfoil 24, for example leading or trailing edge 61 or 62, pressure (concave) or suction (convex) surface 63 or 64, or a combination thereof. Cooling holes or outlets 60 may also be provided on the endwall surfaces of airfoil 24, for example along ID platform 66 and OD platform 68.

Rotor airfoils 22 (FIG. 2A) and stator airfoils 24 (FIG. 2B) are formed of high strength, heat resistant materials such as high temperature alloys and superalloys, and are provided with thermal and erosion-resistant coatings. Airfoils 22 and 24 are also provided with internal cooling passages and cooling holes 60 to reduce thermal fatigue and wear, and to prevent melting when exposed to hot gas flow in the higher temperature regions of a gas turbine engine or other turbomachine. Cooling holes 60 deliver cooling fluid (e.g., steam or air from a compressor) through the outer walls and platform structures of airfoils 22 and 24, creating a thin layer (or film) of cooling fluid to protect the outer (gas path) surfaces from high temperature flow.

While surface cooling extends service life and increases reliability, injecting cooling fluid into the gas path also reduces engine efficiency, and the cost in efficiency increases with the required cooling flow. Cooling holes 60 are thus provided with improved metering and inlet geometry to reduce jets and blow off, and improved diffusion and exit geometry to reduce flow separation and corner effects. Cooling holes 60 reduce flow requirements and improve the spread of cooling fluid across the hot outer surfaces of airfoils 22 and 24, and other gas turbine engine components, so that less flow is needed for cooling and efficiency is maintained or increased.

The cooling holes described herein provide a cooling solution that offers improved film cooling and eliminates or reduces the flow separation problems associated with conventional diffusion-type film cooling holes. The shape of the cooling hole metering section is modified to better direct cooling air to the hole's diffusing section. The described cooling holes provide improved film effectiveness and reduce the likelihood of film separation so that they work as intended at high blowing ratios.

Some cooling holes include two sections: (1) a metering section at or near the hole inlet and (2) a diffusing section at or near the hole outlet. The metering section "meters" the flow of cooling air, regulating the velocity and quantity of air that enters through the inlet. Air flowing through the metering section enters the diffusing section before reaching the hole outlet. The diffusing section causes the cooling air to expand (diffuse) so that a wider cooling film is formed. A recent trend in state of the art cooling holes has been to modify the cooling film by changing the geometry or configuration of the diffusing section of cooling holes. While this technique has yielded some improvements in film cooling, it also presents additional difficulties. For example, some cooling holes with multi-lobed diffusing sections can diffuse the cooling air too much at high blowing ratios, spreading the cooling film too thinly so that "holes" or "gaps" in the cooling film appear. This phenomenon is called flow separation. Fluid in the hot gas path adjacent to the cooling hole can mix into these holes or gaps in the cooling film, transferring unwanted heat to the film cooled component and reducing cooling effectiveness. Additionally, although film cooling hole performance typically improves as the blowing ratio is increased, the expansion ratio of the diffuser can be too great, resulting in flow separation and incomplete filling of the diffuser section of the cooling hole with cooling air. In these circumstances, high temperature gases passing along wall surfaces can mix with the cooling air flowing within the diffuser section of the cooling hole (i.e. hot gas entrainment). The turbulent mixing that occurs during hot gas entrainment can adversely impact film cooling effectiveness and performance of the diffusing section of the cooling hole. Instead of modifying the diffusing section of the cooling hole to reduce the incidence of flow separation and potential entrainment of hot gaspath flow (high temperature gases), which adversely impacts overall cooling hole performance, geometric features are introduced that reduce the propensity of flow separation with highly diffused cooling hole geometries, while also mitigating the amount of turbulent mixing that occurs between the expelled film cooling flow and the free stream gas within the thermal boundary layer. The cooling holes described herein contain modified metering section geometry to improve the overall film cooling performance by improving diffusing section fill characteristics while also reducing the amount of downstream film attenuation.

Figure 3:
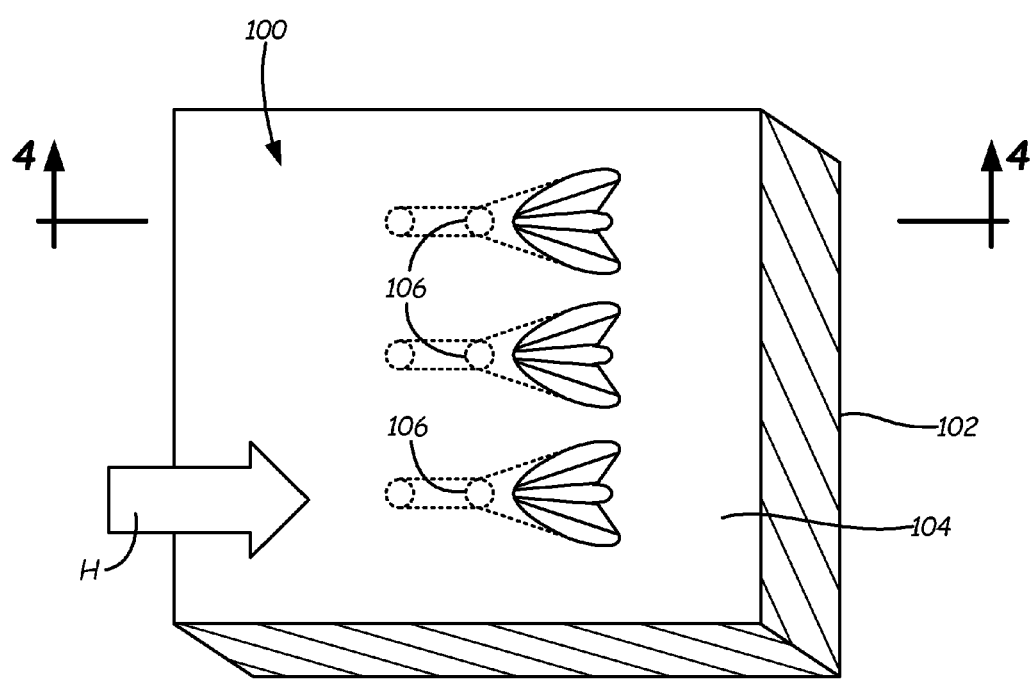
FIG. 3 is a schematic view of a wall having film cooling holes with curved metering sections.

FIG. 3 illustrates a view of a wall of a gas turbine engine component having cooling holes. Wall 100 includes inner wall surface 102 and outer wall surface 104. As described in greater detail below, wall 100 is primarily metallic and outer wall surface 104 can include a thermal barrier coating. Cooling holes 106 are oriented so that their inlets are positioned on the first wall surface 102 and their outlets are positioned on outer wall surface 104. During gas turbine engine operation, outer wall surface 104 is in proximity to high temperature gases (e.g., combustion gases, hot air). Cooling air is delivered inside wall 100 where it exits the interior of the component through cooling holes 106 and forms a cooling film on outer wall surface 104. The diffusing section of cooling hole 106 can have multiple lobes to aid in the lateral diffusion of the cooling air as shown in FIG. 3. In this embodiment, cooling holes 106 have three lobes in the diffusing section.

As described in greater detail below, cooling air enters the metering section of cooling hole 106 and flows out of the diffusing section of cooling hole 106. Cooling holes 106 can be arranged in a row on wall 100 as shown in FIG. 3 and positioned axially so that the cooling air flows in substantially the same direction longitudinally as the high temperature gases flowing past wall 100. In this embodiment, cooling air passing through cooling holes 106 exits cooling holes traveling in substantially the same direction as the high temperature gases flowing along outer wall surface 104 (represented by arrow H). Here, the linear row of cooling holes 106 is substantially perpendicular to the direction of flow H. In alternate embodiments, the orientation of cooling holes 16 can be arranged on outer wall surface 104 so that the flow of cooling air is substantially perpendicular to the high temperature gas flow (i.e. cooling air exits cooling holes 106 radially) or at an angle between parallel and perpendicular (compound angle). Cooling holes 106 can also be provided in a staggered formation on wall 100. Cooling holes 106 can be located on a variety of components that require cooling. Suitable components include, but are not limited to, turbine vanes and blades, blade or vane platforms, shrouds, endwalls, combustors, blade outer air seals, augmentors, etc. Cooling holes 106 can be located on the pressure side or suction side of airfoils. Cooling holes 106 can also be located on the blade tip.

Figure 4:
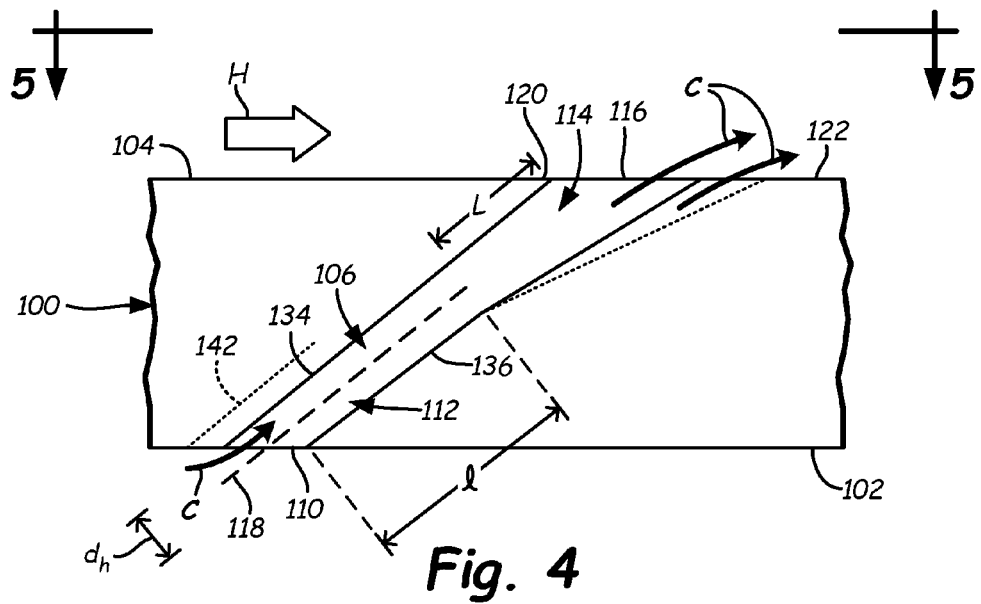
FIG. 4 is a sectional view of a cooling hole of FIG. 3 taken along the line 4-4.

FIGS. 4 through 7 illustrate one embodiment of cooling hole 106 in greater detail. FIG. 4 illustrates a sectional view of film cooling hole 106 of FIG. 3 taken through the center of cooling hole 106 along the line 4-4. Cooling hole 106 includes inlet 110, metering section 112, diffusing section 114 and outlet 116. Inlet 110 is an opening located on inner wall surface 102. Cooling air C enters cooling hole 106 through inlet 110 and passes through metering section 112 and diffusing section 114 before exiting cooling hole 106 at outlet 116 along outer wall surface 104.

Metering section 112 is adjacent to and downstream from inlet 110 and controls (meters) the flow of cooling air through cooling hole 106. In some embodiments, metering section 112 has a substantially constant flow area from inlet 110 to diffusing section 114. Metering sections 112 have a length l and hydraulic diameter $d_h$. Hydraulic diameters ($d_h$) are used to describe flow in non-circular channels. In some embodiments, metering section 112 has a length/according to the relationship: $d_h \le l \le 3d_h$. That is, the length of metering section 112 is between one and three times its hydraulic diameter. The length of metering section 112 can exceed $3d_h$, reaching upwards of $30d_h$. In some embodiments, metering section 112 is inclined with respect to wall 100 as illustrated in FIG. 4 (i.e. metering section 112 is not perpendicular to wall 100). Metering section 112 has a longitudinal axis represented by numeral 118.

Figure 5:
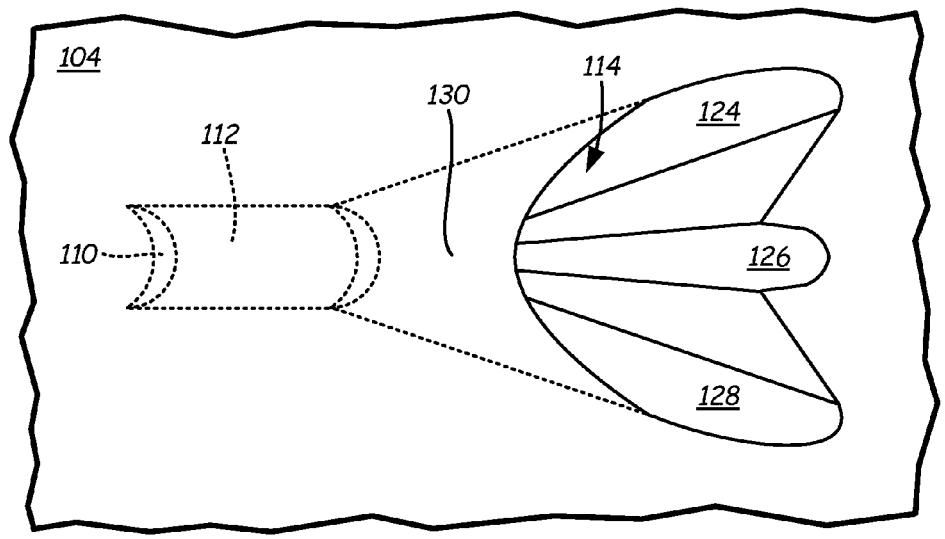
FIG. 5 is a view of the cooling hole of FIG. 4 taken along the line 5-5.

Diffusing section 114 is adjacent to and downstream from metering section 112. Cooling air C diffuses within diffusing section 114 before exiting cooling hole 106 along outer wall surface 104. Outer wall surface 104 includes upstream end 120 (upstream of cooling hole 106) and downstream end 122 (downstream from cooling hole 106). Diffusing section 114 opens along outer wall surface 104 between upstream end 120 and downstream end 122. As shown in FIG. 4, cooling air C diffuses away from longitudinal axis 118 in diffusing section 114 as it flows towards outlet 116. Diffusing section 114 can have various configurations. Diffusing section 114 can have multiple lobes as shown in FIGS. 4 through 8 and described in greater detail in the U.S. patent application entitled "MULTI-LOBED COOLING HOLE AND METHOD OF MANUFACTURE", filed on Feb. 15, 2012 and having the U.S. application Ser. No. 13/544,101, which is incorporated by reference. In this embodiment, diffusing section 114 includes lobes 124, 126 and 128 as shown in FIG. 5. In other embodiments, diffusing section 114 is a more conventional diffusing section such as those described in U.S. Pat. Nos. 4,197,443 or 4,684,323.

To improve the flow of cooling air C through cooling hole 106, metering section 112 does not possess the conventional circular, oblong (oval or elliptical) or racetrack (oval with two parallel sides having straight portions) cross-sectional geometries common in some cooling holes. Instead, metering section 112 includes at least two arcuate surfaces that have arcs that extend in a substantially similar direction.

Figure 6:
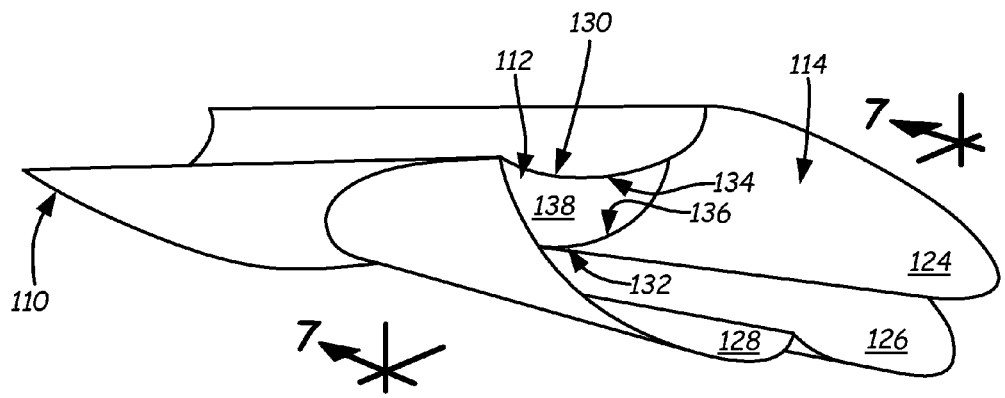
FIG. 6 is a perspective view of the cooling hole of FIG. 4 with the outer wall removed.

FIG. 6 illustrates a perspective view of the cooling hole of FIG. 4. For the purposes of illustration, wall 100 has been removed from the figure to better show cooling hole 106. Metering section 112 includes top portion 130 and bottom portion 132. Top portion 130 includes first arcuate surface 134, and bottom portion 132 includes second arcuate surface 136. As shown in FIG. 6, first arcuate surface 134 and second arcuate surface 136 define flowpath 138 of metering section 112. First arcuate surface 134 is located on wall 100 between outer wall surface 104 and flowpath 138 (shown best in FIG. 7). Second arcuate surface 136 is located on wall 100 between inner wall surface 102 and flowpath 138 (shown best in FIG. 7). As shown in FIG. 6, first arcuate surface 134 and second arcuate surface 136 each form arcs that extend in a substantially similar direction. First arcuate surface 134 is convex; the surface extending towards the center of flowpath 138. Second arcuate surface 136 is concave; the surface extending away from the center of flowpath 138. Due to the convex and concave geometries of these two surfaces, the arc formed by first arcuate surface 134 and the arc formed by second arcuate surface 136 both extend in a generally downward direction as shown in FIGS. 6 and 7.

First arcuate surface 134 and second arcuate surface 136 extend as shown in FIG. 6 for the entire length of metering section 112 (i.e. from inlet 110 to diffusing section 114). In some embodiments, first arcuate surface 134 also extends through diffusing section 114 from inlet 110 to outlet 116 as shown in FIGS. 4 and 6. In some embodiments, metering section 112 has a length greater than $d_h$, where $d_h$ is the hydraulic diameter of metering section 112.

Figure 7:
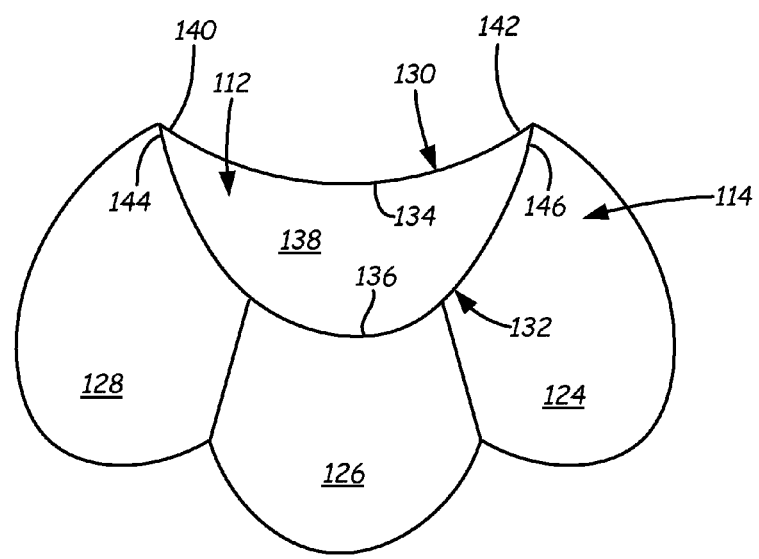
FIG. 7 is a cross-sectional view of the cooling hole of FIG. 6 taken along the line 7-7.

FIG. 7 illustrates a cross-sectional outline of metering section 112 of film cooling hole 106 of FIG. 6 taken along the line 7-7. For the purposes of illustration, wall 100 has been removed from the figure to better show cooling hole 106. FIG. 7 shows metering section 112 from the perspective of diffusing section 114 (i.e. the viewer is looking straight through metering section 112 towards inlet 110).

In some embodiments, first arcuate surface 134 and second arcuate surface 136 intersect. First arcuate surface 134 includes first end 140 and second end 142. Second arcuate surface 136 includes first end 144 and second end 146. As illustrated in FIG. 7, first end 140 of first arcuate surface 134 and first end 144 of second arcuate surface 136 intersect and second end 142 of first arcuate surface 134 and second end 146 of second arcuate surface 136 intersect. In this embodiment, flowpath 138 is crescent shaped. For first arcuate surface 134 and second arcuate surface 136 to intersect, first arcuate surface 134 and second arcuate surface 136 must have different curvatures (i.e. the degree of surface "flatness").

The curved geometry of metering section 112 produces a "covered" region (near top portion 130) where first arcuate surface 134 of metering section 112 prevents cooling air C from diffusing in a forward direction (towards upstream end 120), enabling cooling air C to be "retained" for a longer period of time beneath first arcuate surface 134 before expanding into diffusing section 114. The covered region segregates the high temperature gases flowing along wall 100 from cooling air C and reduces the initial expansion ratio of cooling air C at the upstream end of diffusing section 114 of cooling hole 106. The increased residence time of cooling air C in metering section 112 combined with the reduced expansion ratio at the inlet of diffusing section 114 improves the fill characteristics of the cooling air as it expands along diffusing section 114 of cooling hole 106. This, in turn, lowers the propensity of flow separation of cooling air C along diffusing section 114 due to overexpansion and flow vorticity.

Figure 8:
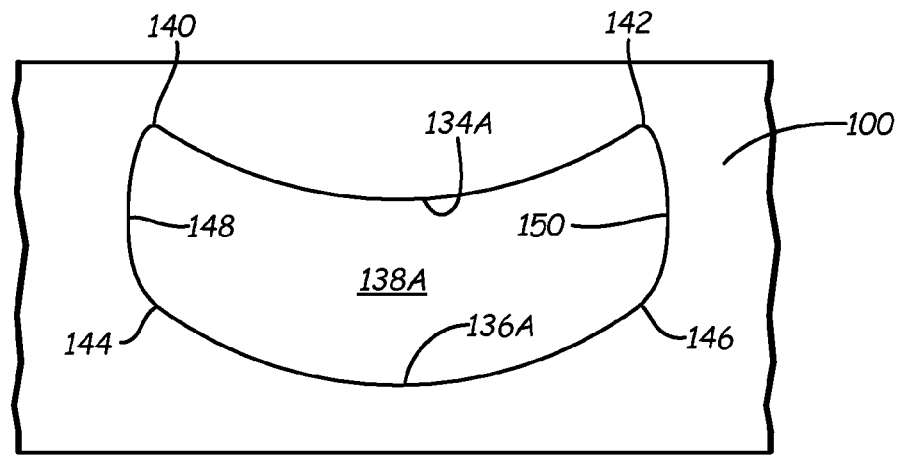
FIG. 8 is a cross-sectional view of the outline of the metering section of another embodiment of a cooling hole with a curved metering section.

In other embodiments, first arcuate surface 134 and second arcuate surface 136 have substantially identical curvature. When first arcuate surface 134 and second arcuate surface 136 have identical curvature, the two surfaces cannot form flowpath 138 where ends 144 and 146 of second arcuate surface 136 both intersect with first arcuate surface 134. In these embodiments, metering section 112 also includes first and second side surfaces. FIG. 8 illustrates a cross-sectional view of the metering section of one such embodiment of a film cooling hole (flowpath 138A). First arcuate surface 134A is concave and second arcuate surface 136A is convex, each surface having identical curvature. First side surface 148 connects first end 140 of first arcuate surface 134A with first end 144 of second arcuate surface 136A. Second side surface 150 connects second end 142 of first arcuate surface 134A with second end 146 of second arcuate surface 136A. First side surface 148 and second side surface 150 can be curved (convex) as shown in FIG. 8. Alternatively, first side surface 148 and second side surface 150 can be straight.

Figure 9:
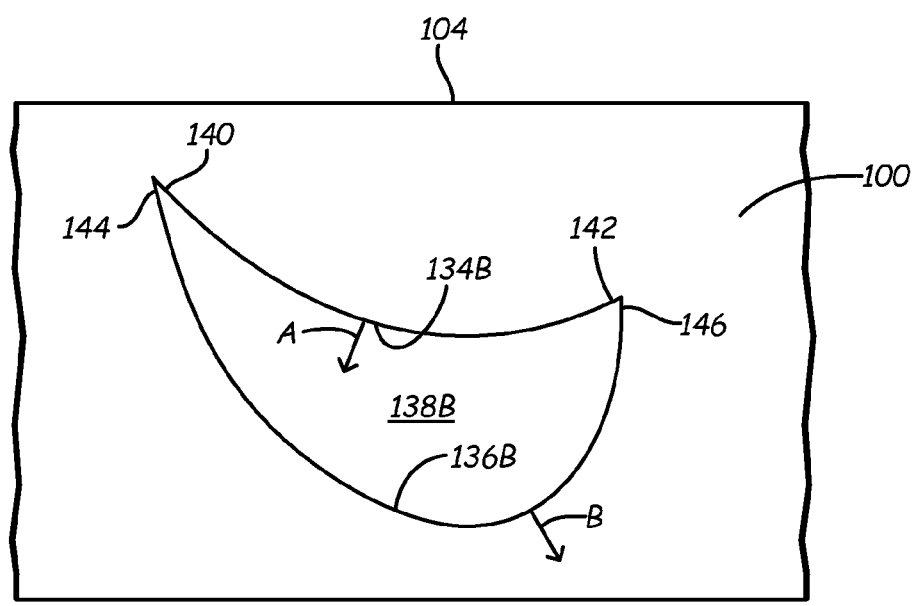
FIG. 9 is a cross-sectional view of the outline of the metering section of another embodiment of a cooling hole with a curved metering section.

In some embodiments, the arcs of first arcuate surface 134 and second arcuate surface 136 extend in substantially similar, but not identical, directions. FIG. 9 illustrates a cross-sectional view of the metering section of a film cooling hole in which the arcs of surfaces 134 and 136 extend in different directions (flowpath 138B), but generally in one direction. First arcuate surface 134B extends in a direction that is generally downward and to the left (represented by arrow A). First end 140 and second end 142 have different elevations relative to outer wall surface 104. Second arcuate surface 136B extends in a direction that is generally downward and to the right (represented by arrow B). The arcs of both first arcuate surface 134B and second arcuate surface 136B extend generally downward, but also left and right to different degrees.

Figure 10:
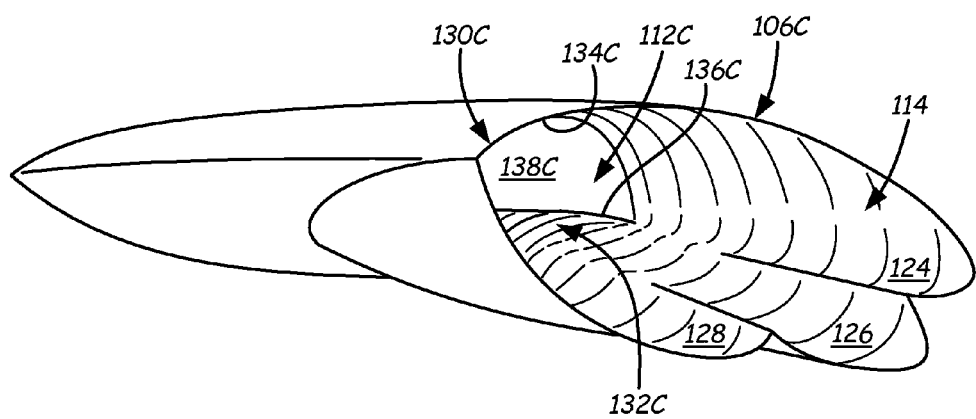
FIG. 10 is a perspective view of another embodiment of a cooling hole with a curved metering section.

FIG. 10 illustrates a perspective view of another embodiment of a cooling hole having a curved metering section. For the purposes of illustration, wall 100 has been removed from the figure to better show cooling hole 106C. Metering section 112C includes top portion 130C and bottom portion 132C. Top portion 130C includes first arcuate surface 134C, and bottom portion 132C includes second arcuate surface 136C. As shown in FIG. 10, first arcuate surface 134C and second arcuate surface 136C define flowpath 138C of metering section 112C. First arcuate surface 134C is concave; the surface extending away from the center of flowpath 138C. Second arcuate surface 136C is convex; the surface extending towards the center of flowpath 138C. Due to the concave and convex geometries of these two surfaces, the arc formed by first arcuate surface 134C and the arc formed by second arcuate surface 136C both extend in a generally upward direction as shown in FIGS. 10 and 11.

Also, as shown in FIG. 10, convex bottom portion 132C of metering section 112C gradually transitions to concave bottom surfaces within diffusing section 114. The contour lines shown in FIG. 10 illustrate the transition from convex to concave surfaces. Depending on the position and flow characteristics of cooling hole 106C, the transition from convex bottom surface to concave bottom surface(s) can occur within diffusing section 114 closer to metering section 112C or closer to the trailing edge of diffusing section 114. Convex bottom portion 132C can transition to a single concave bottom surface, or, as shown in FIG. 10, convex bottom portion 132C can transition to a plurality of concave bottom surfaces.

Figure 11:
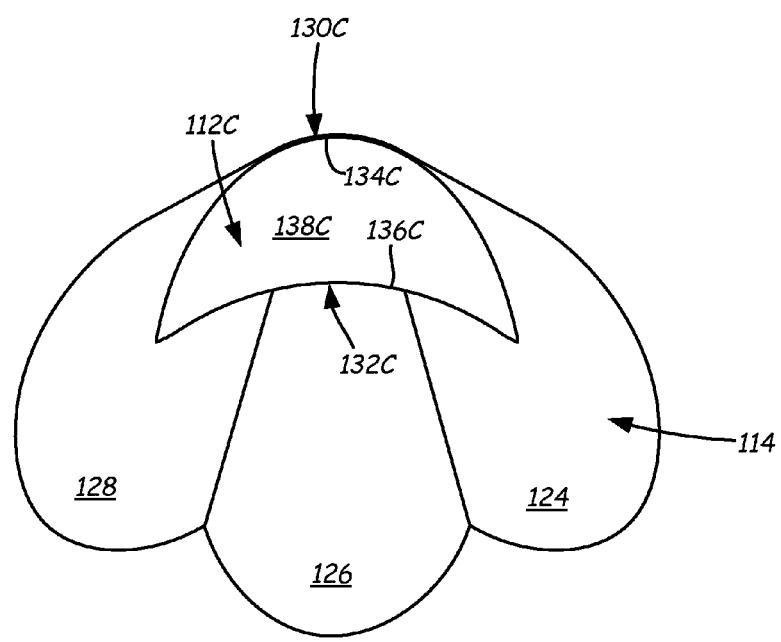
FIG. 11 is a cross-sectional view of the cooling hole of FIG. 10 taken along the line 11-11.

FIG. 11 illustrates a cross-sectional outline of metering section 112C of film cooling hole 106C of FIG. 10 taken along the line 11-11. For the purposes of illustration, wall 100 has been removed from the figure to better show cooling hole 106C. FIG. 11 shows metering section 112C from the perspective of diffusing section 114 (i.e. the viewer is looking straight through metering section 112C towards inlet 110).

In addition to the reduced flow separation and fill improvements noted above, the incorporation of a curved metering shape as depicted in FIGS. 10 and 11 modifies the flow structure within the curved metering section of the cooling hole geometry by generating counter rotating paired vortex structures having the opposite direction of vortex structures observed in single and multi-lobe diffusing sections of cooling hole geometries with conventional cylindrical metering shapes. The counter rotating vortices generated in curved shape metering section 112C functionally result in anti-vortices, canceling out the vortices inherently observed in diffusing section 114 of cooling hole 106C. The combination of the two flow structures within metering section 112C and diffusing section 114 of cooling hole 106C (e.g., anti-vortex and vortex) results in an ejection of cooling air C that contains minimal or no vorticity and is laminar in nature (i.e. little disruption). The ejection of laminar-like cooling air C inherently reduces or mitigates the amount of turbulent mixing between the high temperature gases flowing along wall 100 and the film coolant flow. The reduced mixing between hot and cold fluids reduces the attenuation rate of the film cooling boundary layer, resulting in significantly increased adiabatic film effectiveness and film cooling performance.

By configuring flowpaths 138, 138A, 138B and 138C as described using surfaces that have arcs that extend in a substantially similar direction, cooling air C is better prepared to spread laterally within diffusing section 114 with minimal flow separation. Flowpaths 138, 138B and 138C reduce the likelihood that cooling air C will diffuse in an upward (with respect to FIG. 7) direction (i.e. forward diffusion). When forward diffusion occurs, some cooling air C does not enter diffusing section 114 and jets or blows off away from outer wall surface 104, resulting in reduced or incomplete formation of the film of cooling air meant to cool outer wall surface 104. Flowpaths 138, 138B and 138C encourage cooling air C to diverge laterally (left and right with respect to FIGS. 7, 9 and 10) within metering section 112 and once it reaches lobes 124, 126 and 128 of diffusing section 114. Flowpath 138A encourages cooling air C to flow into the lower left and right corners of metering section 112 (FIG. 8) and also to attach to second arcuate surface 136A to prevent "jet off" or "blow off" at high blowing ratios.

The embodiments of cooling hole 106 described herein allow the use of high blowing ratios of cooling air C. As the blowing ratio increases, the pressure gradient across cooling hole 106 increases. When the pressure gradient across cooling hole 106 is increased, cooling air C is forced to fill the extremities (corners, edges, etc.) of flowpath 138. By filling the entire flowpath 138 with cooling air C, the air flow is less likely to separate one it reaches diffusing section 114 and begins to expand. Thus, flowpaths 138, 138A, 138B and 138C improve the filling of diffusing section 114 with cooling air C. By extending the length (L) of first arcuate surface 134, forward diffusion of cooling air C is further prevented, reducing the expansion ratio of cooling air in diffusing section 114 immediately downstream of metering section 112.

By reducing or eliminating forward diffusion and encouraging lateral diffusion at high blowing ratios, diffusing section 114 is able to provide a better film of cooling air along outer wall surface 104 and cool the gas turbine engine component. Producing a better film of cooling air provides cooling solution flexibility. The number of cooling holes 106 needed to cool the component can be reduced, the temperature of cooling air C used to cool the component can be increased or the component can be exposed to higher temperature environments without overheating. The cooling holes described herein will provide improved film cooling at any blowing ratio, but are particularly suited for blowing ratios between about 0.5 and 10 where the blowing ratio (mass flux ratio) is calculated according to the equation:

$$M = \rho_f V_f^1 / \rho_\infty V_\infty$$

First arcuate surface 134, second arcuate surface 136, first side surface 148 and second side surface 150 can also include vortex-generating structures such as those described in U.S. patent application Ser. No. 12/157,115. Vortex-generating structures present on surfaces 134, 136, 148 and/or 150 can be used to negate flow vortices that are created elsewhere in cooling hole 106 to prevent the formation of kidney vortices at outlet 116 and the unwanted entrainment of high temperature gas into the cooling air film.

The gas turbine engine components, gas path walls and cooling passages described herein can thus be manufactured using one or more of a variety of different processes. These techniques provide each cooling hole and cooling passage with its own particular configuration and features, including, but not limited to, inlet, metering, transition, diffusion, outlet, upstream wall, downstream wall, lateral wall, longitudinal, lobe and downstream edge features, as described above. In some cases, multiple techniques can be combined to improve overall cooling performance or reproducibility, or to reduce manufacturing costs.

Suitable manufacturing techniques for forming the cooling configurations described here include, but are not limited to, electrical discharge machining (EDM), laser drilling, laser machining, electrical chemical machining (ECM), water jet machining, casting, conventional machining and combinations thereof. Electrical discharge machining includes both machining using a shaped electrode as well as multiple pass methods using a hollow spindle or similar electrode component. Laser machining methods include, but are not limited to, material removal by ablation, trepanning and percussion laser machining. Conventional machining methods include, but are not limited to, milling, drilling and grinding.

The gas flow path walls and outer surfaces of some gas turbine engine components include one or more coatings, such as bond coats, thermal barrier coatings, abrasive coatings, abradable coatings and erosion or erosion-resistant coatings. For components having a coating, the inlet, metering portion, transition, diffusion portion and outlet cooling features may be formed prior to coating application, after a first coating (e.g., a bond coat) is applied, or after a second or third (e.g., interlayer) coating process, or a final coating (e.g., environmental or thermal barrier) coating process. Depending on component type, cooling hole or passage location, repair requirements and other considerations, the diffusion portion and outlet features may be located within a wall or substrate, within a thermal barrier coating or other coating layer applied to a wall or substrate, or based on combinations thereof. The cooling geometry and other features may remain as described above, regardless of position relative to the wall and coating materials or airfoil materials.

In addition, the order in which cooling features are formed and coatings are applied may affect selection of manufacturing techniques, including techniques used in forming the inlet, metering portion, transition, outlet, diffusion portion and other cooling features. For example, when a thermal barrier coat or other coating is applied to the outer surface of a gas path wall before the cooling hole or passage is produced, laser ablation or laser drilling may be used. Alternatively, either laser drilling or water jet machining may be used on a surface without a thermal barrier coat. Additionally, different machining methods may be more or less suitable for forming different features of the cooling hole or cooling passage, for example, different EDM, laser machining and other machining techniques may be used for forming the outlet and diffusion features, and for forming the transition, metering and inlet features.

Figure 12A:
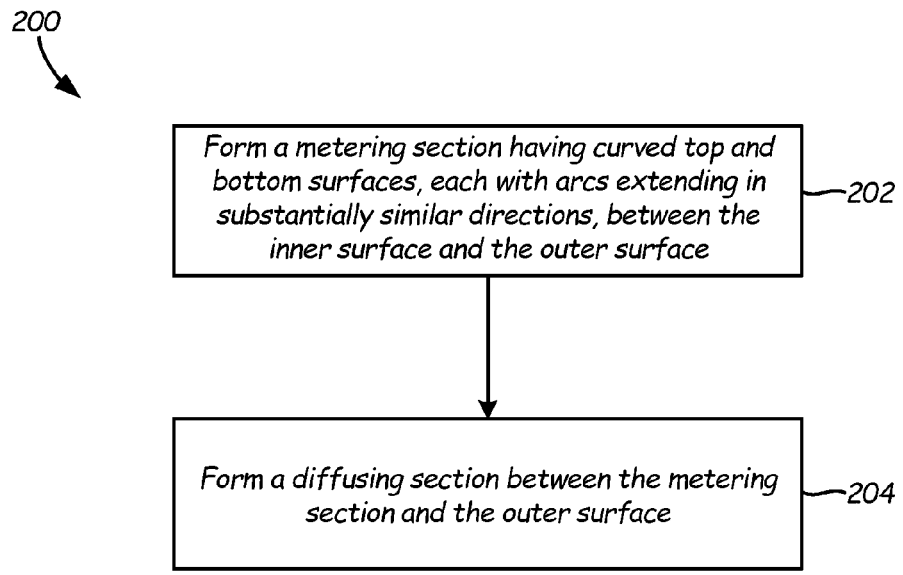
FIG. 12A is a simplified flow diagram illustrating one embodiment of a method for producing a cooling hole in a gas turbine engine component wall.
Figure 12B:
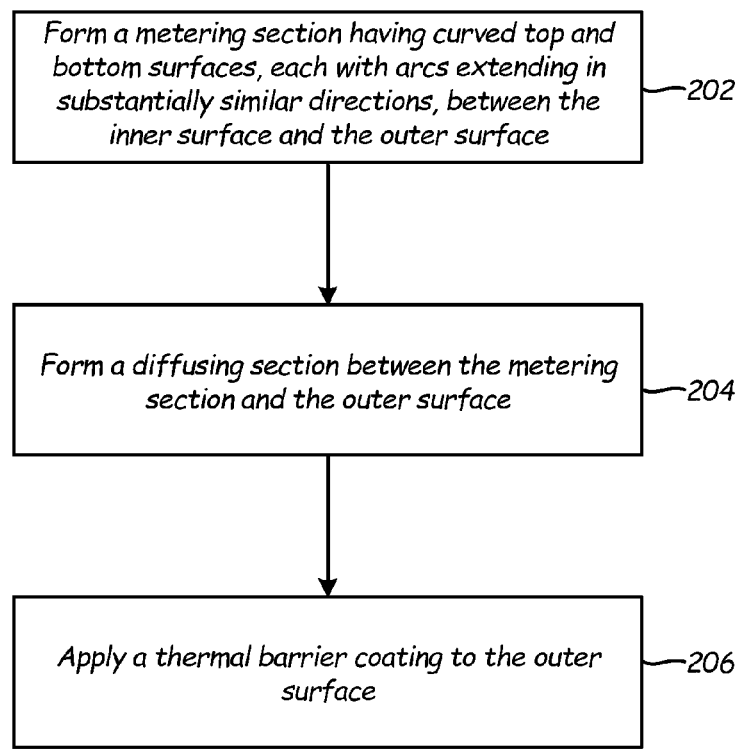
FIG. 12B is a simplified flow diagram illustrating another embodiment of a method for producing a cooling hole in a gas turbine engine component wall.

FIG. 12A is a simplified flow diagram illustrating one embodiment of a method for producing a cooling hole with a curved metering section in a gas turbine engine wall having inner and outer surfaces. Method 200 includes forming a metering section between the inner and outer surfaces (step 202) and forming a diffusing section between the metering section and the outer surface (step 204). The metering section formed includes a top surface (first arcuate surface 134) and a bottom surface (second arcuate surface 136). Each surface (surfaces 134 and 136) has an arc that extends in a substantially similar direction. Metering section 112 is formed in step 202 by one or more of the casting, machining or drilling techniques described above. The technique(s) chosen is/are typically determined based on performance, reproducibility and cost. In embodiments where step 202 occurs prior to step 204, inlet 110 and portions of diffusing section 114 and outlet 116 can also be formed during formation of metering section 112. Diffusing section 114 is formed in step 204 by one or more of the casting, machining or drilling techniques described above. As with metering section 112, the technique(s) chosen is/are typically determined based on performance, reproducibility and cost. In embodiments where step 202 occurs prior to step 204, outlet 116 is fully formed during step 204. Steps 202 and 204 can be performed before or after an optional thermal barrier coating application. In optional step 206 (shown as a step in method 200A in FIG. 12B), a thermal barrier coating is applied to outer wall surface 104. Application of the thermal barrier coating can also include the application of a bond coating prior to the thermal barrier coating. Steps 202, 204 and step 206 can be performed in any order depending on the location of cooling hole 106 and the location of diffusing section 114 relative to the metallic wall and the thermal barrier coating. As previously stated, the order of steps 202, 204 and step 206 can affect the machining or drilling techniques chosen for steps 202 and 204.

Figure 13A:
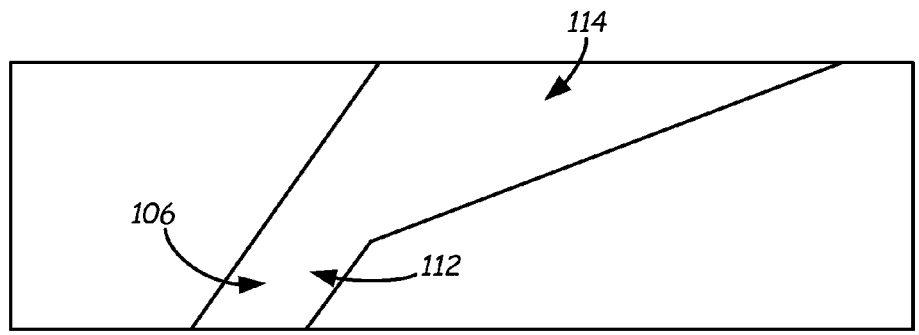
FIG. 13A is a sectional view of another embodiment of a cooling hole taken along the line 4-4 as shown in FIG. 3.
Figure 13B:
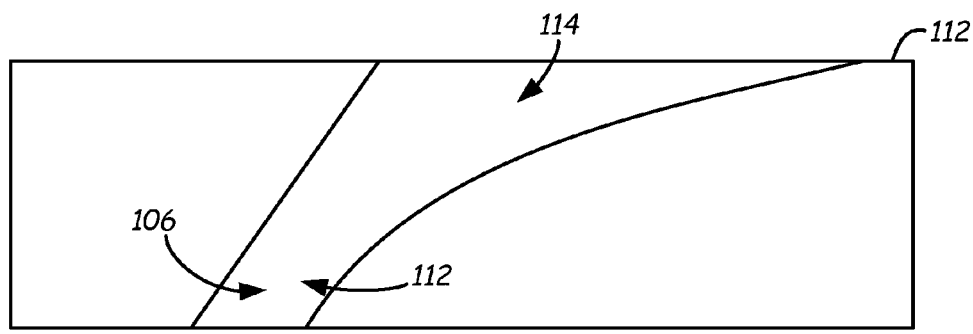
FIG. 13B is a sectional view of another embodiment of a cooling hole taken along the line 4-4 as shown in FIG. 3.

FIGS. 13A, 13B, 14A, 14B, 15A, 15B, 15C and 15D illustrate additional embodiments of cooling holes having curved metering sections. FIGS. 13A and 13B are similar to the view shown in FIG. 4 and are meant to illustrate different embodiments of the bottom surface of diffusing section 114 compatible with the described curved metering sections. As shown in FIG. 13A, the bottom surface of diffusing section 114 can extend from metering section 112 to outlet 116 in a linear fashion (i.e., a straight diffuser). Alternatively, as shown in FIG. 13B, the bottom surface of diffusing section 114 can extend from metering section 112 to outlet 116 in a convex fashion (i.e., a convex diffuser). In other embodiments, the bottom surface of diffusing section 114 can include a portion that is linear and a portion that is convex.

Figure 14A:
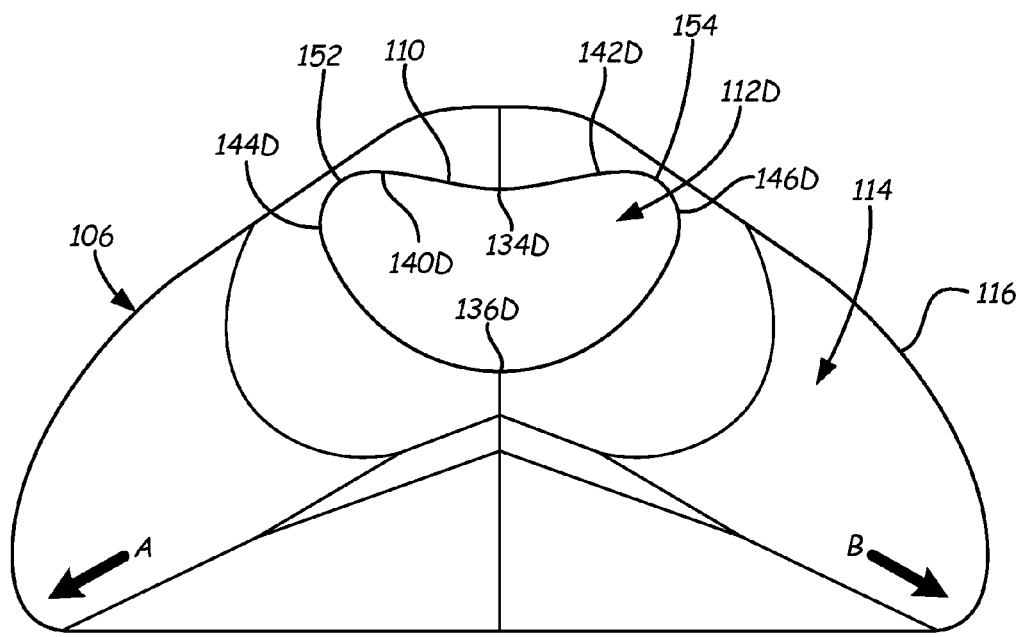
FIG. 14A is a view of the cooling hole of FIG. 13A looking from the outlet toward the inlet.
Figure 14B:
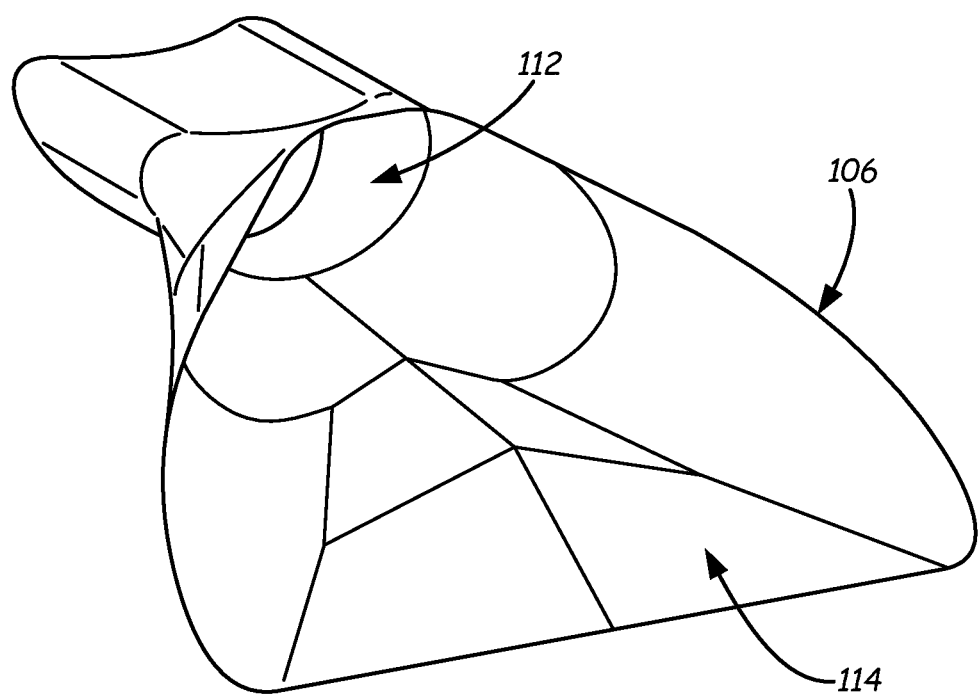
FIG. 14B is a perspective view of the cooling hole of FIG. 13A.

FIG. 14A illustrates a view looking through one embodiment of cooling hole 106 from outlet 116 to inlet 110. FIG. 14A is similar to the view shown in FIG. 7. FIG. 14B illustrates a perspective view of cooling hole 106 shown in FIG. 14A. Metering section 112D is defined by first arcuate surface 134D, second arcuate surface 136D, first curved portion 152 and second curved portion 154. First arcuate surface 134D extends from first end 140D to second end 142D. Second arcuate surface 136D extends from first end 144D to second end 146D.

Instead of the ends of first arcuate surface 134D and second arcuate surface 136D meeting (as shown in FIG. 7), the ends of first arcuate surface 134D and second arcuate surface 136D are connected by separate curved portions. First curved portion 152 connects first end 140D of first arcuate surface 134D and first end 144D of second arcuate surface 136D. Second curved portion 154 connects second end 142D of first arcuate surface 134D and second end 146D of second arcuate surface 136D.

In some embodiments, first curved portion 152 and second curved portion 154 are arcuate portions, each having a radius of curvature. First curved portion 152 and second curved portion 154 can have the same radius of curvature or different degrees of curvature. In some embodiments, a ratio of the radius of curvature of first curved portion 152 (and/or second curved portion 154) to the hydraulic diameter of metering section 112 ($d_h$) is between 0.1 and 8. In more particular embodiments, the ratio of the radius of curvature of first curved portion 152 (and/or second curved portion 154) to the hydraulic diameter of metering section 112 is between 0.5 and 4. These ratios of curvature for first curved portion 152 and second curved portion 154 to the hydraulic diameter of metering section 112D create beneficial cooling vortices in metering section 112D that counteract the kidney vortices observed in state of the art film cooling holes. Together, surfaces 134D, 136D, 142D and 144D create a beneficial vortex that moves the majority of cooling flow near the perimeters of metering section 112D (i.e. surfaces 134D, 136D, 142D and 144D). This spreads out the cooling air flow within metering section 112D, which then spills out into diffusing section 114, enabling the majority of the cooling air flow to reach the opposite sides of diffusing section 114 (shown in FIG. 14A by arrows A and B). This cooling air flow provides momentum to the cooling air flow so that cooling hole 106 forms a cooling film in the regions of arrows A and B that counteract the kidney vortices that carry the hot gas path air (arrow H in FIG. 4) and try to bring the hot gas path air to the surface of outer wall surface 104. The beneficial cooling vortex created by metering section 112D provides improved cooling performance and film effectiveness and reduces operational metal temperatures of components in which these cooling holes are deployed.

Figure 15A:
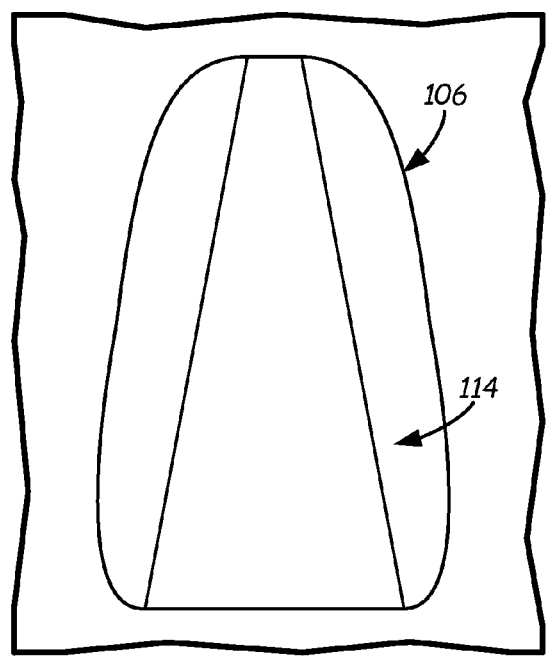
FIG. 15A is a view of one embodiment of the cooling hole of FIG. 14 taken along the line 5-5 as shown in FIG. 4.
Figure 15B:
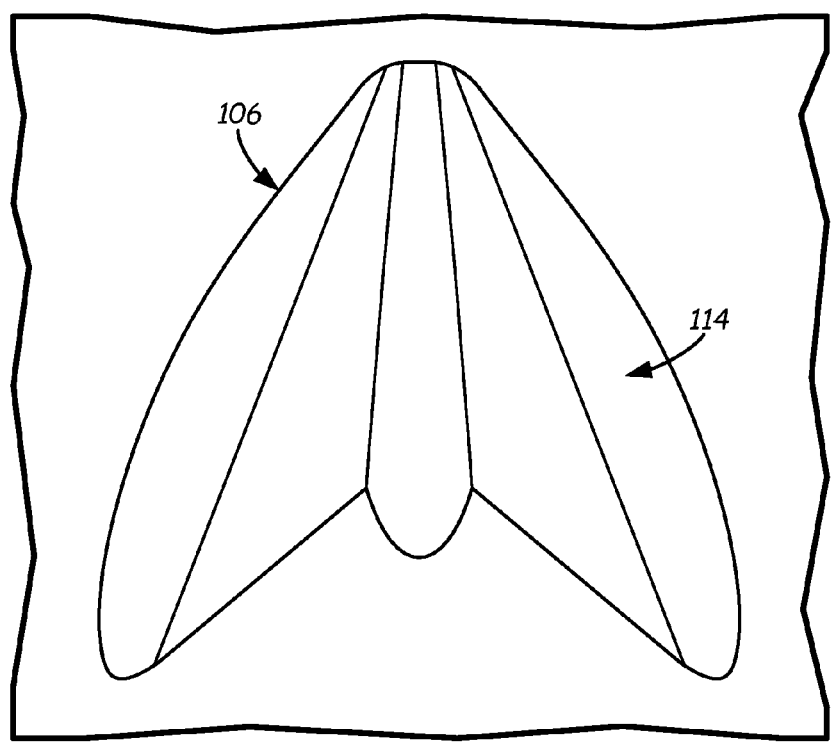
FIG. 15B is a view of another embodiment of the cooling hole of FIG. 14 taken along the line 5-5 as shown in FIG. 4.
Figure 15C:
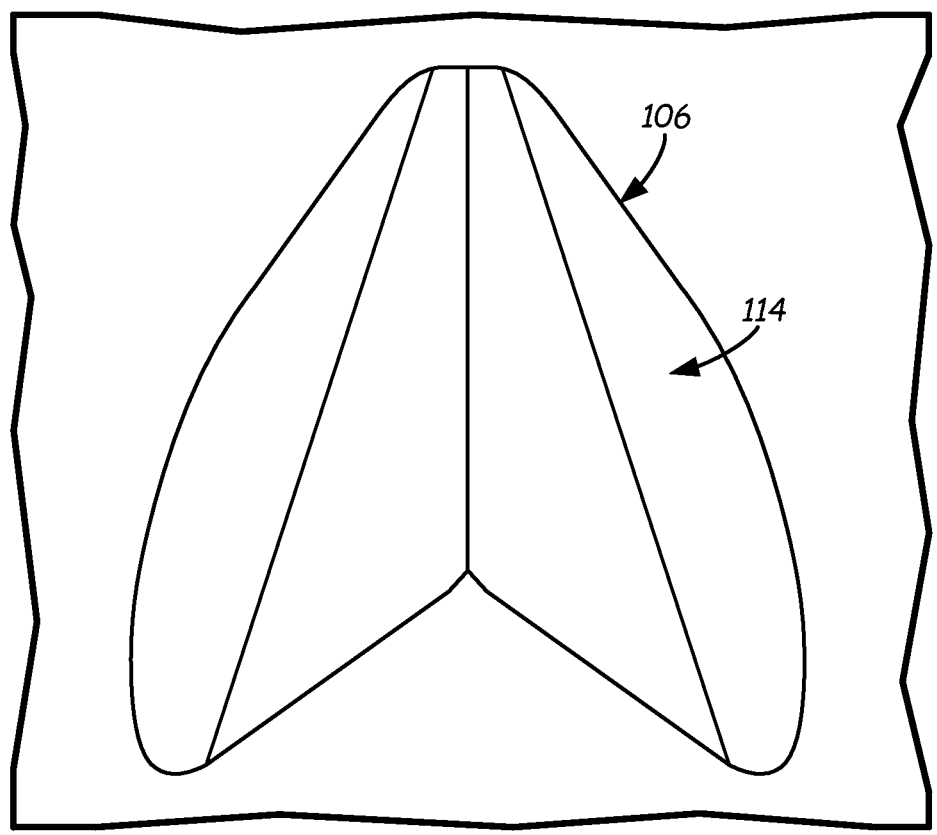
FIGS. 15C and 15D are views of other embodiments of the cooling hole of FIG. 14 taken along the line 5-5 as shown in FIG. 4.
Figure 15D:
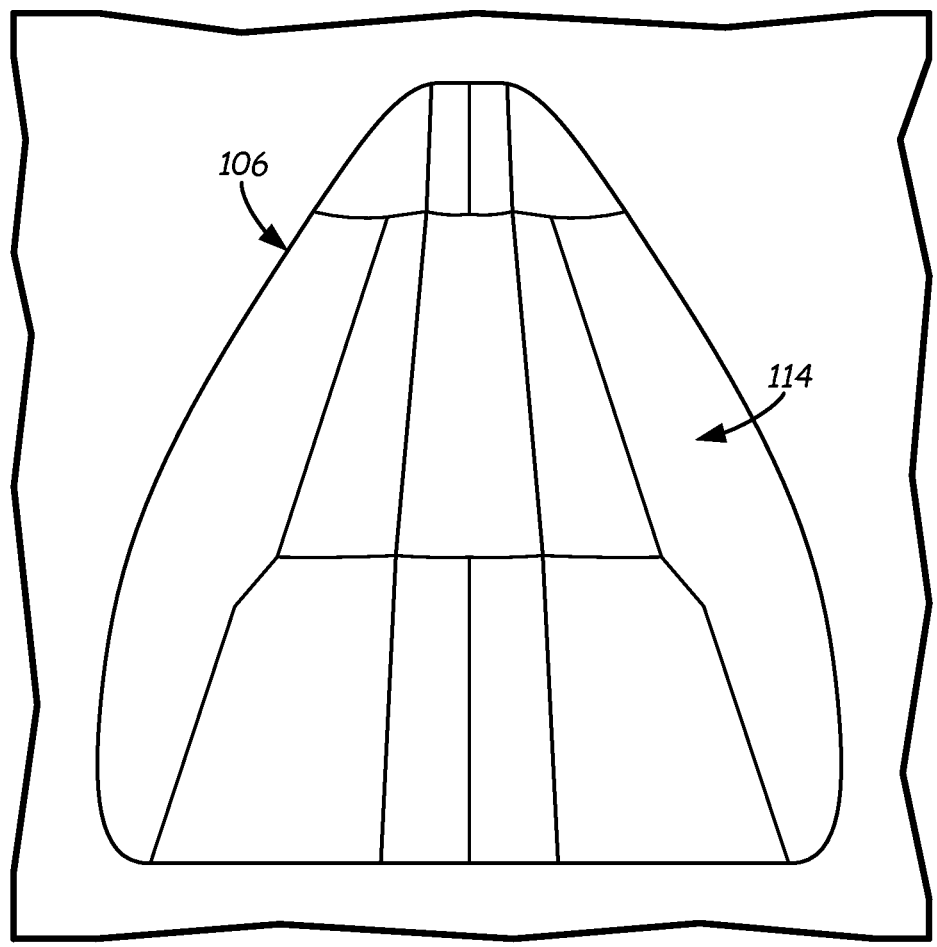

FIGS. 15A, 15B, 15C and 15D illustrate some embodiments of diffusing sections 114 that can benefit from metering section 112 described herein. FIG. 15A illustrates a straight diffuser, FIG. 15B illustrates a three-lobed diffuser with a non-linear downstream trailing edge, FIG. 15C illustrates a two-lobed diffuser and FIG. 15D illustrates a three-lobed diffuser with a straight downstream trailing edge. FIG. 14D illustrates a two-lobed diffuser with a straight downstream trailing edge. In each of these diffusing sections 114, the configuration of metering section 112D described above improves the cooling performance of cooling holes 106 when compared to cooling holes with a metering section having a circular, oval or elliptical cross section.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:

1. A gas turbine engine component having a cooling hole, the component comprising:
   a first wall comprising a cooling hole inlet;

a second wall generally opposite the first wall and comprising a cooling hole outlet;

a metering section extending downstream from the inlet and having a hydraulic diameter ($d_h$), the metering section comprising:

a substantially convex first surface extending from a first end to a second end;

a substantially concave second surface extending from a third end to a fourth end;

a first curved portion connecting the first end and the third end; and a second curved portion connecting the second end and the fourth end, wherein the first curved portion has a first radius such that a ratio of the first radius to the hydraulic diameter of the metering section is between 0.1 and 8, and where in the second curved portion has a second radius such that a ratio of the second radius to the hydraulic diameter of the metering section is between 0.1 and 8; and a diffusing section extending from the metering section to the outlet.

2. The component of claim 1, wherein the ratio of the first radius to the hydraulic diameter of the metering section is between 0.5 and 4, and wherein the ratio of the second radius to the hydraulic diameter of the metering section is between 0.5 and 4.

3. The component of claim 1, wherein the metering section has a length that is greater than the hydraulic diameter of the metering section.

4. The component of claim 1, wherein the diffusing section comprises first and second lobes that each diverge longitudinally and laterally from a central axis of the cooling hole.

5. The component of claim 4, wherein the diffusing section comprises a third lobe positioned between the first and second lobes.

6. The component of claim 4, wherein the cooling hole outlet includes a straight downstream trailing edge that extends between the first and second lobes.

7. The component of claim 1, wherein the convex first surface and the concave second surface have differing curvature.

8. The component of claim 1, wherein the substantially convex first surface of the metering section is a bottom surface, and wherein the substantially convex first surface transitions to a concave bottom surface within the diffusing section.

9. The component of claim 1, wherein the film cooling hole is located on a component selected from the group consisting of blade airfoils, vane airfoils, blade platforms, vane platforms, combustor liners, blade outer air seals, blade shrouds, augmentors and endwalls.

10. The component of claim 1, wherein the convex first surface comprises an arc that is curved to extend towards the concave second surface, and wherein the concave second surface comprises an arc that is curved to extend away from the convex first surface.

11. The component of claim 1, wherein the first radius and the second radius are equal.

12. The component of claim 1, wherein a bottom surface of the diffusing section extends linearly from the metering section to the outlet.

13. The component of claim 1, wherein a bottom surface of the diffusing section extends in a convex fashion from the metering section to the outlet.

14. The component of claim 1, wherein a portion of a bottom surface of the diffusing section between the metering section and the outlet is convex.

15. A gas turbine engine component wall comprising:

opposing first and second wall surfaces;

an inlet at the first wall surface;

an outlet at the second wall surface;

a metering section commencing at the inlet and having a hydraulic diameter ($d_h$), the metering section comprising:

a top portion having a first arcuate surface that extends from a first end to a second end;

a bottom portion having a second arcuate surface that extends from a third end to a fourth end, wherein the first arcuate surface and the second arcuate surface have arcs extending in substantially similar directions;

a first curved portion connecting the first end and the third end and having a first radius such that a ratio of the first radius to the hydraulic diameter of the metering section is between 0.1 and 8; and a second curved portion connecting the second end and the fourth end and having a second radius such that a ratio of the second radius to the hydraulic diameter of the metering section is between 0.1 and 8; and a diffusing section in communication with the metering section and terminating at the outlet.

16. The wall of claim 15, wherein the first arcuate surface is curved so that its arc extends away from the bottom portion and the second arcuate surface is curved so that its arc extends towards the top portion.

17. The wall of claim 15, wherein the first arcuate surface is convex curved so that its arc extends towards the bottom portion and the second arcuate surface is concave curved so that its arc extends away from the top portion.

18. The wall of claim 15, wherein the metering section has a hydraulic diameter, and wherein the metering section has a length that is greater than the hydraulic diameter of the metering section.

* * * * *